(12) United States Patent
DiCianni

(10) Patent No.: US 9,321,492 B2
(45) Date of Patent: Apr. 26, 2016

(54) CARGO BED HAVING SELF-ALIGNING SIDE WALL PANELS

(71) Applicant: International Truck Intellectual Property Company, LLC, Lisle, IL (US)

(72) Inventor: Matthew Edward Michael DiCianni, Mokena, IL (US)

(73) Assignee: International Truck Intelllectual Property Company, LLC, Lisle, IL (US)

(*) Notice: Subject to any disclaimer, the term of this patent is extended or adjusted under 35 U.S.C. 154(b) by 0 days.

(21) Appl. No.: 14/338,463

(22) Filed: Jul. 23, 2014

(65) Prior Publication Data
US 2016/0023692 A1    Jan. 28, 2016

(51) Int. Cl.
*B62D 33/03* (2006.01)
*B62D 27/06* (2006.01)

(52) U.S. Cl.
CPC ............... *B62D 33/03* (2013.01); *B62D 27/06* (2013.01)

(58) Field of Classification Search
CPC ................................ B62D 33/03; B62D 27/06
USPC ........................................ 296/183, 66, 26.15
See application file for complete search history.

(56) References Cited

U.S. PATENT DOCUMENTS

| | | | | |
|---|---|---|---|---|
| 6,644,708 B1* | 11/2003 | Grzegorzewski | ......... | B60P 1/43 296/10 |
| 6,758,514 B1* | 7/2004 | Walkden | ................ | B62D 33/02 296/165 |
| 7,506,909 B2* | 3/2009 | Barnes | ................... | B62D 21/14 296/26.12 |
| 2005/0093339 A1* | 5/2005 | Klassen | ................. | B62D 33/03 296/183.1 |

* cited by examiner

*Primary Examiner* — Joseph D Pape
*Assistant Examiner* — Dana Ivey
(74) *Attorney, Agent, or Firm* — Jeffrey P. Calfa; Mark C. Bach

(57) ABSTRACT

A cargo bed has a succession of swinging side wall panels whose top margins self-align when staked in upright positions.

4 Claims, 4 Drawing Sheets

CARGO BED HAVING SELF-ALIGNING SIDE WALL PANELS

TECHNICAL FIELD

The disclosed subject matter relates to a cargo bed onto which cargo is loaded for transport, commonly on a truck vehicle.

BACKGROUND

Some cargo beds which have a succession of side wall panels which can be individually swung selectively to upright positions that place top margins of the side wall panels higher than the floor, and downwardly from upright positions to non-upright positions. In order to keep the top margins of successive side wall panels aligned with each other, a side wall panel may be latched to an adjacent one by a releasable latch mechanism at their top margins.

SUMMARY

The present disclosure provides mechanisms for self-aligning top margins of successive side wall panels without latches.

One general aspect of the disclosed subject matter relates to a cargo bed comprising a multi-sided floor for providing underlying support for cargo and at least one side wall panel mounted for swinging about an axis which passes through a bottom margin of the side wall panel parallel with a side of the floor for enabling the side wall panel to be swung selectively to an upright position which places a top margin of the side wall panel higher than the floor and downwardly from upright position to a non-upright position.

The cargo bed further comprises an upwardly open channel which has a length parallel with the side of the floor and through which the axis passes. At least one stake is selectively positionable on the side wall panel to stake and unstake the side wall panel to and from the upwardly open channel, and at least one spring mechanism is disposed to apply force to the bottom margin of the side wall at a location above the axis which opposes swinging of the side wall panel to the upright position and which when the side wall panel has been swung to upright position, applies force which keeps the bottom margin of the side wall panel fast against a wall of the channel.

Another general aspect relates to a truck vehicle for transporting cargo and comprising a cargo bed having a multi-sided floor for providing underlying support for cargo and multiple side wall panels mounted in succession along a side of the floor for swinging about a common axis which passes through bottom margins of the side wall panels parallel with the side of the floor for enabling each side wall panel to be individually swung selectively to an upright position which places a top margin of the side wall panel higher than the floor in lengthwise alignment with the top margin of a succeeding side wall panel, and downwardly from upright position to a non-upright position.

The cargo bed further comprises a succession of aligned upwardly open channels which extend lengthwise parallel with the side of the floor and through which the axis passes.

At least one stake is selectively positionable on each side wall panel to stake and unstake the side wall panel to and from a respective upwardly open channel, and at least one spring mechanism is disposed to apply force to the bottom margin of each side wall at a location above the axis which opposes swinging of a side wall panel to the upright position and which when a side wall panel has been swung to upright position, applies force which keeps the bottom margin of the side wall panel fast against a wall of the respective upwardly open channel The foregoing summary is accompanied by further detail of the disclosure presented in the Detailed Description below with reference to the following drawings which are part of the disclosure.

DETAILED DESCRIPTION

Figure 1:
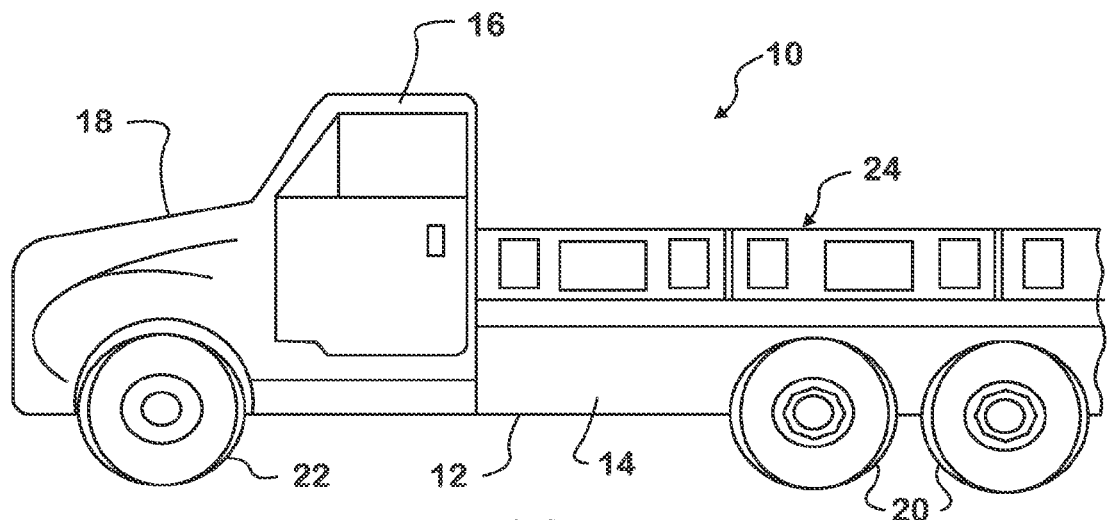
FIG. 1 is a left side view of a truck vehicle which has a cargo bed.

FIG. 1 shows a truck vehicle 10 having a chassis 12, including a chassis frame 14 on which a cab body 16 is supported. A hood 18 in front of cab body 16 covers an engine which is part of a powertrain which propels truck vehicle 10 via rear drive wheels 20. Truck vehicle 10 is steered via front steered wheels 22.

Figure 2:
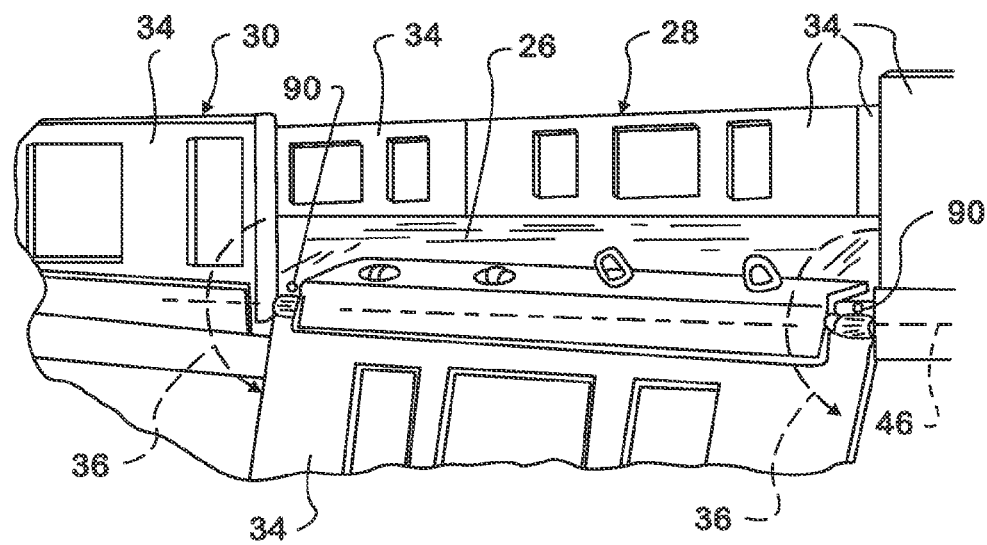
FIG. 2 is a fragmentary perspective view of a portion of the cargo bed.

To the rear of cab body 16 chassis frame 14 supports a cargo bed 24 which, as shown in FIG. 2, comprises a horizontal floor 26, a right side wall 28, and a left side wall 30. Cargo bed 24 may also comprise a front wall immediately to the rear of cab body 16 and an opposite rear wall. Each of the two side walls 28, 30 comprises multiple side wall panels 34 which can be swung from an upright position outwardly and downwardly as suggested by arrows 36 in FIG. 2 which show one side wall panel 34 swung in excess of 90° from upright position.

Each side wall panel 34 comprises multiple posts 38 (see FIG. 3 also) to which sheeting 40 is attached. Rigid rectangular steel tubing is a suitable material for posts 38, and posts 38 may occasionally be referred to as tubes 38 in the following description. Stamped sheet steel is a suitable material for sheeting 40, allowing it to be joined to posts 38 by welding. A side wall panel may also comprise additional structural members such as horizontal rails 42.

Figure 3:
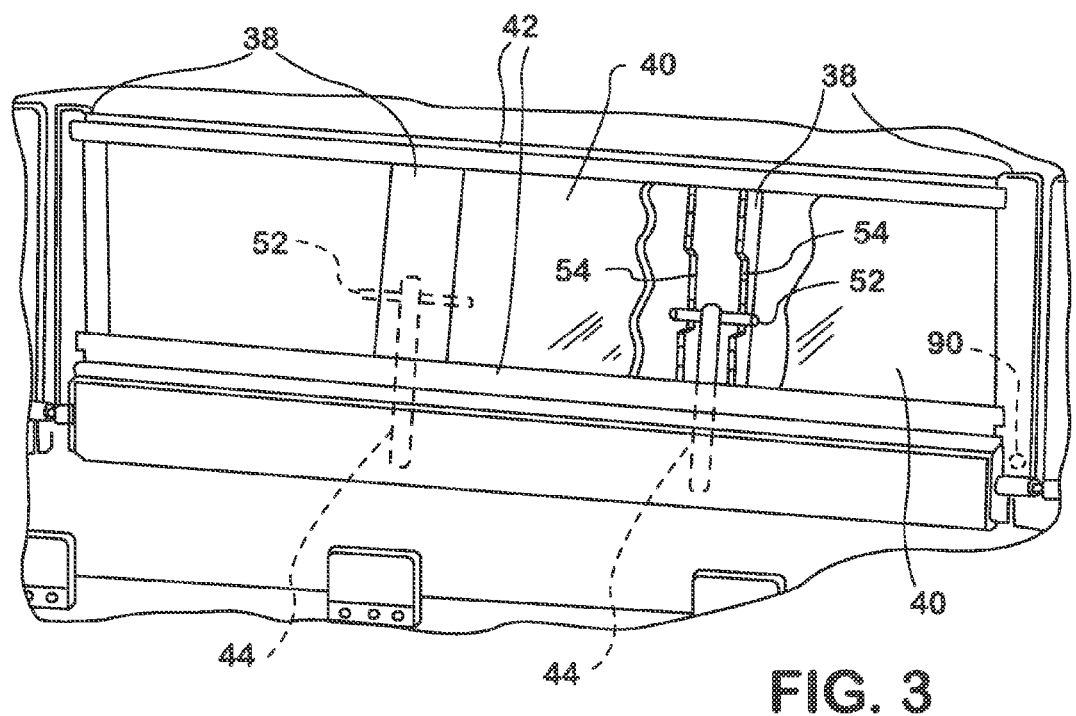
FIG. 3 is an enlarged fragmentary perspective view with a portion broken away to show more detail.

FIG. 3 shows a side wall panel 34 which comprises four rectangular steel tubes 38. Two of tubes 38 are outer end posts and the other two are inner intermediate posts. A respective stake 44 is associated with each intermediate post 38. Each stake 44 is movable along the length of the respective post 38 for staking side wall panel 34 to cargo bed 24 when the side wall panel is in upright position and for unstaking the side wall panel from the cargo bed to allow the side wall panel to be swung outwardly and downwardly from upright position and thereafter swung back to upright position.

Figure 5:
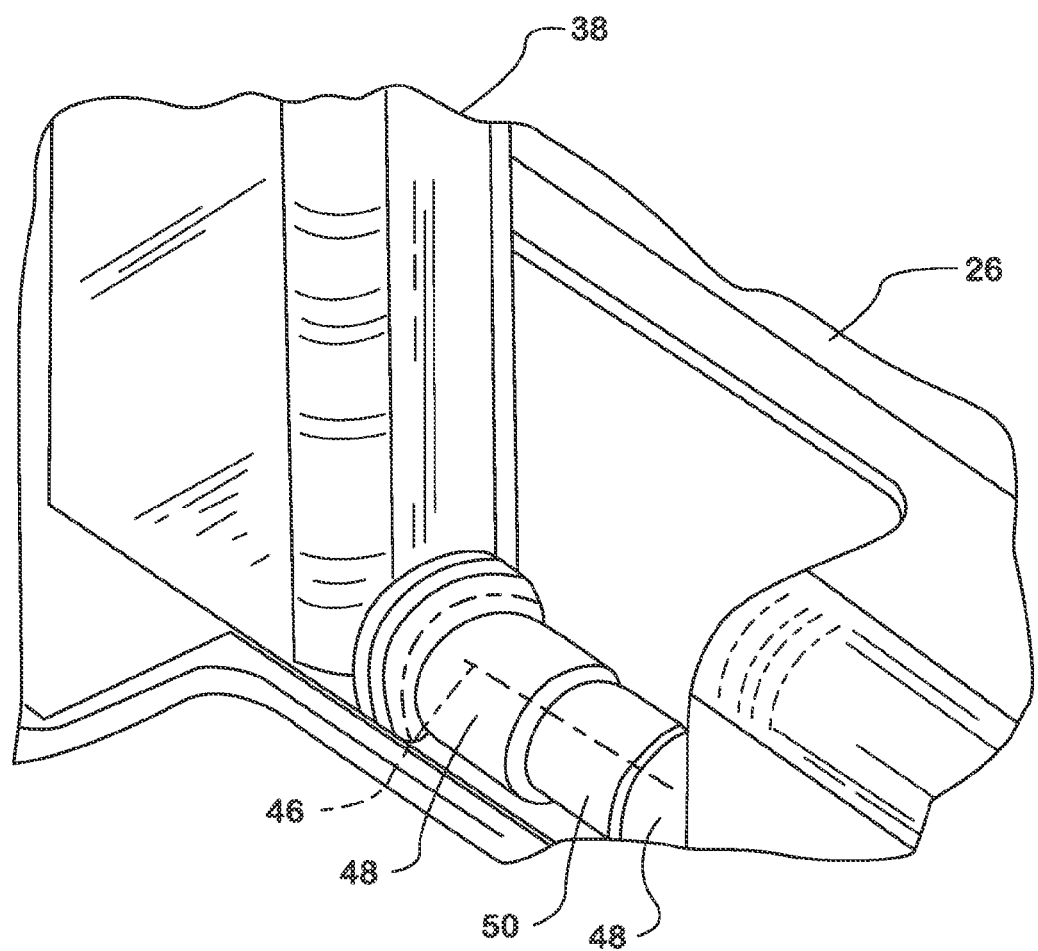
FIG. 5 is an enlarged fragmentary perspective view with a portion broken away to show more detail.

Each side wall panel 34 can swing about a common horizontal axis 46. A bottom end of each outer end post 38 extends beyond a bottom margin of the respective side wall panel's sheeting 40 and contains a hinge barrel 48 which is exposed in FIG. 5 by the outer end post from the nearer side wall panel having been removed for the purpose of illustration. In this way, confronting ends of adjacent side wall panels have aligned hinge barrels 48 through which a pivot pin 50 extends to enable each side wall panel to swing about axis 46 independently of adjacent side wall panels.

Each stake 44 comprises a proximal end which contains a round bar 52 extending transversely from opposite sides through respective slots 54 in opposite walls of the respective tube 38. A stake is moved by applying force to its bar 52 in either a proximal or a distal direction. Slots 54 extend lengthwise of each post 38 to guide movement of stake 44 within a range of travel between an extended position shown in FIG. 3 where bars 52 are at or near one limit of the travel range. Applying a proximal force to a bar will move it from the illustrated extended position to a retracted position at or near an opposite limit of the travel range. Manual access to stakes 44 for staking and unstaking a side wall panel 34 is available on the floor side of the cargo bed.

Figure 6:
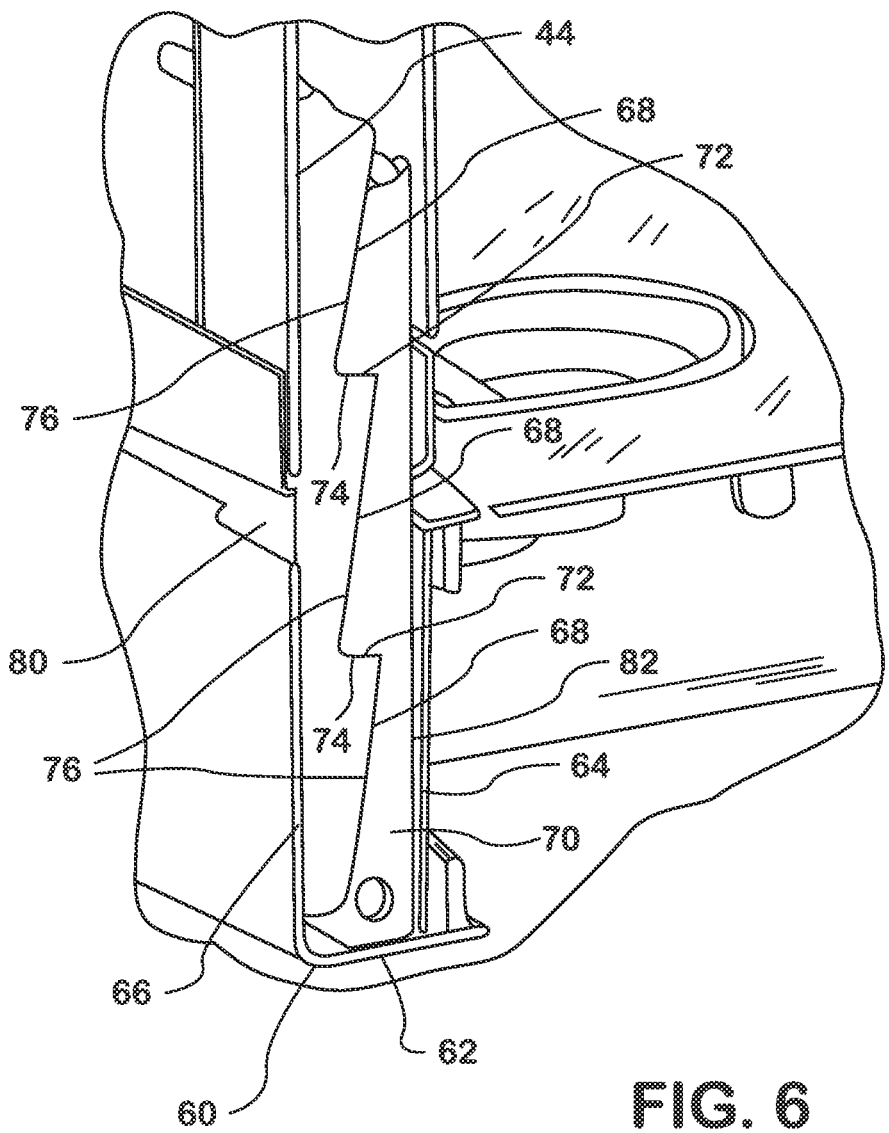
FIG. 6 is another enlarged fragmentary perspective view with a portion broken away to show more detail.

Running lengthwise along right and left sides of cargo bed 24 are upwardly open channels 60 each having a horizontal bottom wall 62, a vertical inner side wall 64, and a vertical outer side wall 66. Each channel 60 is substantially coextensive in length with a respective side wall panel 34 but is free of interference with the swing of the side wall panel about axis 46. With a side wall panel in upright position and its stakes 44 in extended position, a distal end portion of each stake is disposed within the respective channel as shown in FIG. 6.

That distal end portion comprises a succession of wedging surfaces 68 which are joined by supporting surfaces 72 on which a wedge 70 can be supported. Wedge 70 has supported surfaces 74 via which it can rest on supporting surfaces 72 when the stake is in retracted position. Wedge 70 also comprises a succession of wedged surfaces 76 each of which is joined with an adjacent wedged surface 76 by a supported surface 74.

With side wall panel 38 upright and a stake 44 in retracted position, both stake 44 and wedge 70 are clear of channel 60 with the force of gravity causing wedge 70 to rest on the distal end portion of stake 44. As a stake 44 is moved toward extended position, the weight of wedge 70 keeps it supported on stake 44 as both stake and wedge enter channel 60.

The distance between a flat outer surface 80 of stake 44 and a flat inner surface 82 of wedge 70 is less than the distance between channel side walls 64 and 66, enabling the stake and wedge to enter channel 60. Wedge 70 extends slightly beyond the distal end of stake 44 and will come into abutment with bottom wall 62 which arrests its movement. Continued movement of stake 44 then begins to force stake and wedge apart until surfaces 80 and 82 are forced against walls 66 and 64 respectively, thereby wedging the stake and wedge in the channel and consequently preventing side wall panel 34 from being swung from its upright position.

After stake 44 has moved sufficiently toward retracted position to remove both stake and wedge out of channel 60, side wall panel 34 can be swung down from its upright position. That unwedging of a stake results in wedge 70 being carried by stake 44 out of channel 60. The size of tube 38 allows some free movement of the stake and wedge within the interior of the tube while preventing wedge 70 from coming off stake 44.

Additional forces are being applied to a side wall panel 34 as its stakes 44 are being wedged in channel 60. Those forces are provided by two compression spring mechanisms 90 mounted on cargo bed 24 near the lengthwise ends of the side wall panel. The locations are marked in FIGS. 2 and 3 by the reference numerals 90.

Figure 4:
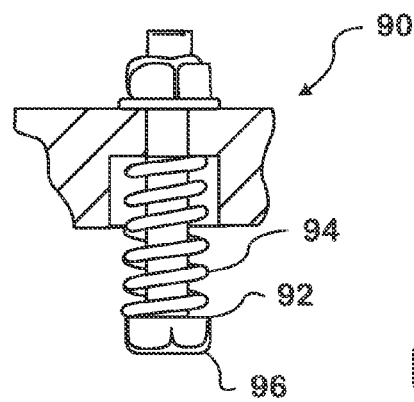
FIG. 4 is a fragmentary plan view in cross section of a spring mechanism.

FIG. 4 shows an example of such a spring mechanism. A plunger 92 is mounted on a wall of cargo bed 24 for horizontal displacement in a direction transverse to the length of a side wall panel 34 and is biased in an outward direction by a helical compression spring 94. Spring mechanism 90 assumes the condition shown in FIG. 6 when side wall panel 34 has been unstaked and swung out of upright position far enough to lose contact with a head 96 of plunger 92.

As side wall panel 34 is swung back toward upright position, outer end posts 38 will abut heads 96 of plungers 92 before the side wall panel reaches upright position. As the side wall panel continues toward upright position, springs 94 are increasingly compressed, urging the bottom margin of the side wall panel which is within channel 60 outwardly against channel side wall 66 with ever increasing force. By forcing the bottom margin of side wall panel 34 against side wall 66 with large forces, 500 pounds each for example, at locations just above axis 46, the side wall panel is held secure. The location of each spring mechanism just above axis 46 provides a sufficiently long lever arm to overcome the large spring forces for enabling a person pushing on the top margin of a side wall panel to force the side wall panel to upright position where it can be staked to cargo bed 24.

The coactions of the spring forces applied by spring mechanisms 90 and the wedging forces applied by stakes 44 and wedges 70 collectively cause a side wall panel 34 to be held secure in a geometrically defined position in relation to its channel 60. A combination of precise dimensional alignment of all channels 60 along each side of cargo bed 24 and of structural rigidity of each side wall panel 34 and channel 60 results in the upper margins of successive side wall panels 34 attaining proper alignment with each other along each side wall 28, 30 without a latch mechanism for latching the upper margin of each side wall panel to an adjacent one.

What is claimed is:

1. A cargo bed comprising:
    a floor for providing underlying support for cargo and at least one side wall panel mounted for swinging about an axis which passes through a bottom margin of the at least one side wall panel parallel such that the at least one side wall panel swings between an upright position which places a top margin of the at least one side wall panel higher than the floor and a non-upright position;
    the cargo bed further comprising an upwardly open channel which has a length parallel with a side of the floor;
    at least one stake positioned on the at least one side wall panel to stake and unstake the at least one side wall panel to and from the upwardly open channel;
    at least one spring mechanism disposed at the bottom margin of the at least one side wall panel at a location above the axis such that the at least one spring mechanism opposes swinging of the at least one side wall panel to the upright position and when the at least one side wall panel is in the upright position, keeps the bottom margin of the at least one side wall panel against a wall of the upwardly open channel;
    the at least one side wall panel comprising multiple posts disposed perpendicular to the axis;
    sheeting attached to the multiple posts; and
    the multiple posts comprising four rectangular tubes, two of the four rectangular tubes are outer end posts and another two of the four rectangular tubes are inner intermediate posts, one of the at least one stake associated with one of the inner intermediate posts, and one of the at least one spring mechanism disposed at the bottom margin of the at least one side wall panel at each outer end post.

2. A truck vehicle for transporting cargo and comprising:
    a cargo bed having a floor for providing underlying support for cargo and multiple side wall panels mounted in succession along a side of the floor for swinging about a common axis which passes through bottom margins of each of the multiple side wall panels parallel with the side of the floor so that each of the multiple side wall panels swings to an upright position which places a top margin of each of the multiple side wall panels higher than the floor, and aligned lengthwise with the top margin of a succeeding one of the multiple side wall panels, and downwardly from the upright position to a non-upright position;

the cargo bed further comprising a succession of aligned upwardly open channels which extend lengthwise parallel with the side of the floor;

at least one stake positioned on each of the multiple side wall panels to stake and unstake one of the multiple side wall panels to and from one of the succession of aligned upwardly open channels;

and at least one spring mechanism disposed at each of the bottom margins at a location above the common axis such that the at least one spring mechanism opposes swinging of at least one of the multiple side wall panels to the upright position and when at least one of the multiple side wall panels has been swung to its upright position, keeps the bottom margin of the at least one of the multiple of side wall panels against a wall of one of the succession of aligned upwardly open channels in which each of the multiple side wall panels comprises multiple posts which are disposed perpendicular to the common axis and to which sheeting is attached, in which each of the multiple posts of each of the multiple side wall panels comprise four rectangular tubes, two of the four rectangular tubes are outer end posts and another two of the four rectangular tubes are inner intermediate posts, a stake associated with each of the intermediate posts, and one of the least one spring mechanism disposed at each of the bottom margins of each of the multiple side wall panels at each of the outer end posts.

3. The truck vehicle as set forth in claim 2 in which the at least one stake carries a wedge for wedging the at least one stake in one of the succession of aligned upwardly open channels.

4. The truck vehicle as set forth in claim 2 in which each of the at least one spring mechanism comprises a compression spring and a movable plunger.

\* \* \* \* \*